Aug. 4, 1936.  S. VORECH ET AL  2,049,984
RELAY VALVE
Filed Aug. 24, 1931  2 Sheets-Sheet 1

INVENTOR.
STEPHEN VORECH
WILFRED A. EATON
BY
ATTORNEY.

Aug. 4, 1936.   S. VORECH ET AL   2,049,984
RELAY VALVE
Filed Aug. 24, 1931   2 Sheets-Sheet 2

INVENTOR.
STEPHEN VORECH
WILFRED A. EATON
BY
*H. O. Clayton*
ATTORNEY.

Patented Aug. 4, 1936

2,049,984

UNITED STATES PATENT OFFICE 2,049,984

RELAY VALVE

Stephen Vorech and Wilfred A. Eaton, Pittsburgh, Pa., assignors to Bendix-Westinghouse Automotive Air Brake Company, Pittsburgh, Pa., a corporation of Delaware Application August 24, 1931, Serial No. 558,974

11 Claims. (Cl. 303—26)

This invention relates in general to automotive air brake systems and in particular to the control valves for trailer brake equipment.

Of the various valves employed to control the operation of the trailer brake equipment the so-called application and release valve and the emergency valve are of most importance, and it is with a view to increasing the efficiency of these valves that the present invention is designed. The former valve functions to apply and release the trailer brakes and the latter serves to automatically apply the brakes in case of a "break in two" between the tractor and trailer.

It is a particular object of the invention to combine the aforementioned valves as one compact structure, which is in contradistinction to the conventional practice of making the valves separate and distinct units. Such a structure effects an economy of manufacture by virtue of the elimination of parts, and likewise increases the effectiveness of the valvular control, the few parts tending to minimize the possibility of inoperativeness.

In one desirable arrangement a single valve stem within the combined valve assembly serves as a common mounting for both the inlet valve and the automatically operated closure valve of the emergency valve structure.

A further feature of the invention relates to certain details of the emergency valve wherein opposed springs act on the valve operating diaphragm to render the same less sensitive to pressure differentials, obviate leakage and in general insure a more uniform operation of the diaphragm.

A still further object of the invention resides in means for obviating undesirable "blowing down" of the reservoir pressure due to a rapid opening and closing or oscillatory movement of the intake valve. This vibratory or oscillatory effect is due, among other causes, to the inertia of the parts.

Further features of the invention including the provision of an emergency valve unit detachable from the application and release unit, novel details of construction and combinations of parts will become apparent from the detailed description of the invention to follow, taken in conjunction with the accompanying drawings illustrating the invention, in which.

Figure 1:
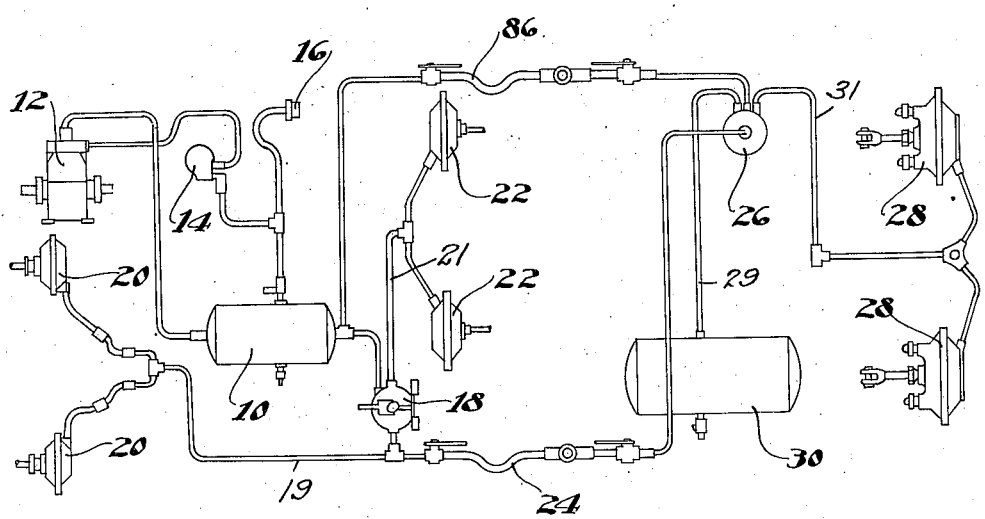
Figure 1 is a diagrammatic view of truck and trailer brake equipment embodying one form of our combined relay and emergency valve.

Referring in general to the brake system in which the aforementioned valve assembly is incorporated, there is disclosed diagrammatically in Figure 1 truck and trailer brake equipment comprising a tractor reservoir 10 charged by compressor 12 with the usual governor 14 and air gage 16 in circuit. Master valve 18, of the self-lapping type, located on the truck controls the brake pressure of the front and rear truck brake chambers 20 and 22 respectively, and also controls, through a service line 24, the operation of our combined relay and emergency valve 26, the latter controlling the operation of the trailer brake chambers 28. The air pressure for the trailer chambers is supplied by a trailer reservoir 30, the pressure of the latter being maintained by the truck reservoir through the intermediary of the control valve as will be explained in greater detail hereinafter.

Our invention is particularly concerned with the refinement of the trailer control valve structure. As disclosed in Figures 2 and 3, a valve body 32 is closed at its ends by caps 34 and 36. The cap or cover 34 serves to compress spring 38 against washer 40, the latter sealing the periphery of a rubber valve operating diaphragm 42 against a ring flange 44 in the body of the valve. The diaphragm 42 is attached to the stem 46 of a piston-like guide member 48, the latter being normally spaced a predetermined distance from a stop 50 integral with the valve body, the said member 48 constituting a guiding spider having spaced peripheral portions 49, arms 51 and spaced peripheral ports 51ª. The diaphragm 42 normally rests upon a second flange 52 on the valve body and also upon the peripheral edge flange 54 on the guide. The flanges 44 and 52 integral with the valve body together outline the exhaust port of the valve opening to atmosphere at ports 56, Figure 3.

The diaphragm and attached guide serve to actuate valve stem 58, the end 60 of the latter having a sliding fit within a bore in the guide. The stem serves as a mounting for intake valve 62, which is normally pressed against its seat 64 by compression spring 66, the latter being interposed between an emergency valve operating diaphragm 68 and the end cap 36. Diaphragm 68 is sealed at its edge against the cap 36 by compression spring 70. Spring 66 is particularly useful in maintaining a tight seal of the intake valve 62 upon its seat, thereby obviating leakage at this point; this spring also makes the valve less sensitive to pressure differentials between chambers 72 and 74, which is desirable. Spring 70 insures the seating of the diaphragm upon the cap and compensates for any warping of the diaphragm which might result in leakage. Inasmuch as the emergency action of the valve structure is dependent upon a tight seal at this point, the function of the spring in maintaining the seal is thus apparent. The valve stem 58 also supports an emergency valve member 76, the rubber seating member 78 of which is adapted to seat at 80.

In operation, a slight opening of the master valve 18 serves to admit air under pressure to the truck brake chambers 20 and 22 through conduits 19 and 21 respectively to thereby actuate the truck brakes. A portion of this air serves to operate the trailer valve 26 approximately simultaneously with the operation of the truck brakes. In this valve operation air under pressure is admitted through conduit 24 to chamber 82 above the diaphragm 42, forcing the latter with its attached guide downwardly to open intake valve 62, placing the trailer brake chambers 28 in communication with the trailer reservoir 30 via conduit 29, valve chambers 74 and 72, and conduit 31. It is to be particularly noted, however, that the emergency valve 76 is not closed during this operation, this being obviated by the contact of the guide with stop 50, and that accordingly air under pressure from chamber 72 passes into chamber 84 past open valve 76.

If the master valve actuating member is momentarily held in open position, the degree of air pressure to the truck brake chambers and to the trailer control valve is limited to a predetermined maximum, this by virtue of the well-known lapping of the master valve. When the pressure within the chamber 84 in the trailer control valve increases to a degree such that the opposing forces on the diaphragm 42 balance each other, the intake valve 62 closes without, however, venting the chamber 72 to atmosphere, the valve control being then balanced or "lapped" and the trailer brakes held applied. This lapping of the valve is substantially coincident with the lapping of the master valve, any lag due to air flow, etc., being substantially negligible.

Figure 2:
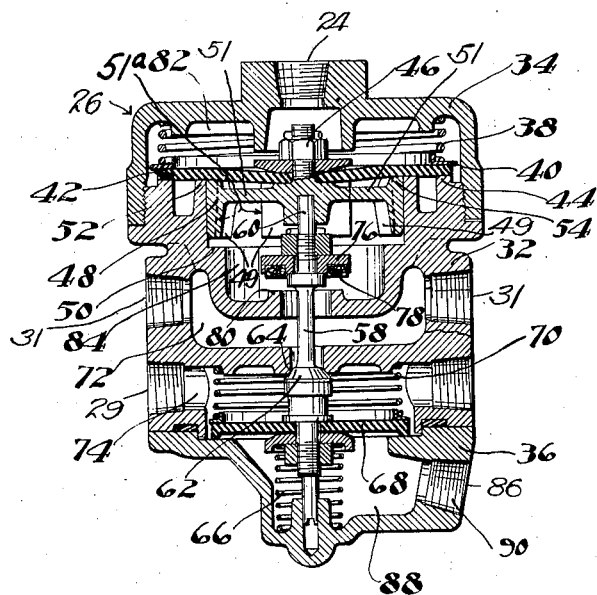
Figures 2 and 3 are sectional views through the body of the combined valve of Figure 1.
Figure 3:
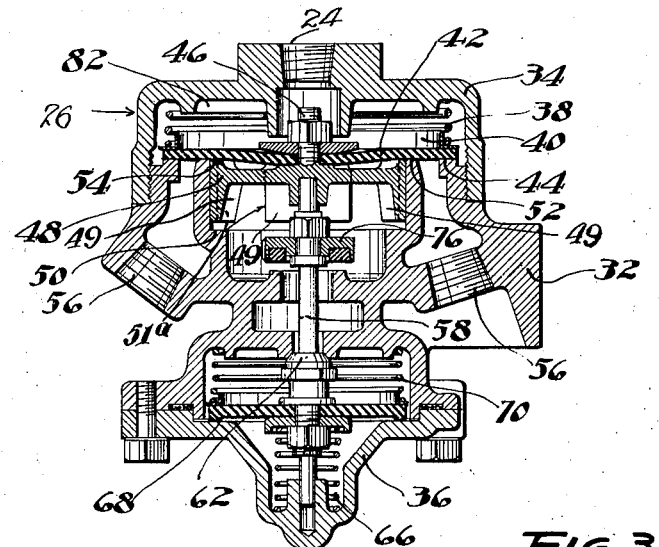
Figure 4:
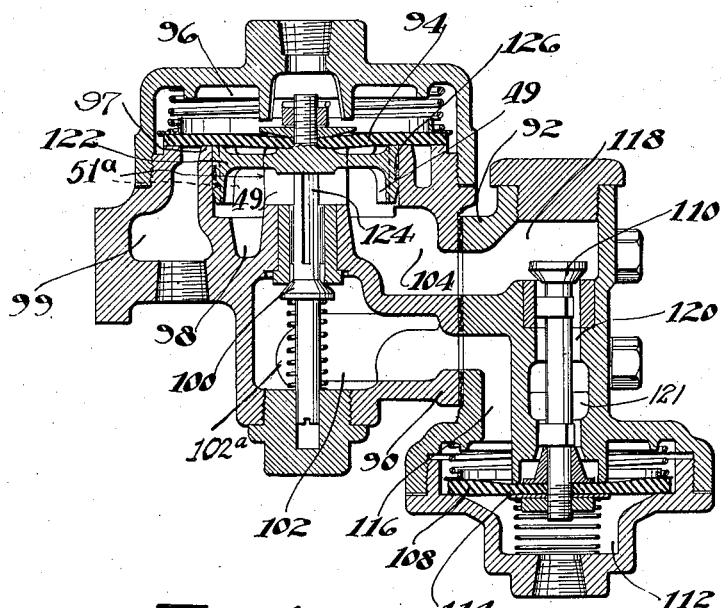
Figure 4 is a sectional view through a modified form of application and emergency valve structure.

Upon further application of the master valve the aforementioned cycle is repeated, and upon release of said valve by venting the same the reduction of pressure in chamber 82 creates a pressure differential between chambers 82 and 84 sufficient to permit upward movement of the guide and the venting of the trailer brake chambers to atmosphere via ports 51ª and 56, see Figs. 2–4.

The air removed from the trailer reservoir during the aforementioned brake application is replaced from the truck reservoir, the air being conducted by emergency line 86 to chamber 88 entering at port 90 and thence flowing around the edge of diaphragm 68 into chamber 74 and into the trailer reservoir. The spring 70 is sufficiently weak to permit the necessary yielding of the diaphragm. The pressure within chambers 74 and 88 is, therefore, at all times approximately equal, which renders the diaphragm 68 normally ineffective to disturb intake valve 62.

Referring now to the emergency operating phase of the valve structure, if the trailer should accidently break away from the truck, severing the air hose connections 24 and 86, there would automatically result a rapid reduction in pressure in chamber 88, communicating with hose connection 86. The air in chamber 74 under trailer reservoir pressure then presses the diaphragm 68 downwardly at its edge to seal the communication between chambers 74 and 88, the pressure differential also serving to move the central portion of the diaphragm downwardly to seat the valve 76 and open inlet valve 62. The trailer brakes are thus automatically applied by air under pressure from the trailer reservoir 30 through pipe 29, chamber 74, past open inlet valve 62, chamber 72, pipe 31, to the brake chambers 28 to decelerate the disconnected trailer and bring the same to an emergency stop.

A very compact valve assembly is thus provided, the valve stem 58 serving as a common mounting for the emergency valve 76 and the inlet valve 62, the latter being automatically opened during the emergency phase of the valve operation. It will also be noted that by removing spring 70, diaphragm 68 and the valve 76 there remains a completely operable application and release valve assembly which may function as such without the aid of the collateral emergency assembly provided by the aforementioned parts.

There is disclosed in Figure 4 an embodiment of relay and emergency valve structure wherein the units are to a degree separate, being secured together by pads 90 and 92 on the respective units. The relay or application and release valve unit comprises a rubber diaphragm 94 serving as an exhaust valve in the manner heretofore described with respect to the valve of Figures 3 and 4, and more particularly described in our copending application No. 509,857, filed January 19, 1931. Chamber 96 is connected to the master valve through any intake pipe connection, not shown, and the chamber 98 below the diaphragm is adapted to be connected to the trailer brake chambers, through normally open valve 110 and ducts 120 and 121.

The diaphragm 94 is normally in such position as to maintain the brake chambers vented to atmosphere via duct 120, chamber 98 guiding spider 122 having ports 51ª and exhaust chamber 99. When air is admitted to chamber 96 by the master valve, the diaphragm 94 is deflected inwardly to close the exhaust valve constituted by the diaphragm and rim 97 and open an inlet valve 100, thus permitting air to flow from the trailer reservoir through a suitable pipe connection to chamber 102 and past inlet valve 100 into chamber 98 and thence to the brake chambers. The inlet valve 100 closes when the pressure in chamber 98 builds up substantially equal to that created in chamber 96. When the service line pressure is exhausted by the master valve, the diaphragm 94 is deflected upwardly by the pressure in chamber 98 the full amount to release air from the trailer brake chambers.

The emergency valve unit, also disclosed in Figure 4 and secured as above described to the relay unit, contains a similar diaphragm 108 having an emergency valve 110 attached to it. The chamber 112 is connected to the emergency line, and this pressure holds the diaphragm sealed at 114, and air under pressure passes around the edge of the diaphragm charging the trailer reservoir via intercommunicating chambers 116 and 102 and passage 102ª connected with said reservoir. With the diaphragm thus sealed at 114 the emergency valve 110 is held away from its seat allowing the passage of air from chamber 104 in the relay valve to chamber 118 in the emergency valve and hence to the brake chambers via duct 120 in the emergency valve and ports therein, not shown.

Should the trailer break away from the tractor, or the hose burst, the sudden reduction thus brought about in the emergency line will lower the pressure acting on diaphragm 108 so that trailer reservoir pressure in chamber 116 acting downwardly upon the diaphragm will move it breaking the seal at 114, resulting in an upward flow of air around the emergency valve stem to the brake chambers, thus producing an emergency application of the trailer brakes. It will be noted that with this operation the valve 110 is closed by the downward movement of the diaphragm, thus cutting off the brake chambers from chambers 118 and 104, which are at this time open to atmosphere. This action also causes a sealing of the diaphragm 108 at its edge upon its seat closing the opening to the emergency line, so that the brakes are held applied without leakage through the ruptured lines.

A particular feature of the above described embodiment lies in the detachable mounting of the emergency valve unit to the application and release or relay valve unit. Either unit may thus be employed to the exclusion of the other by merely connecting the trailer reservoir and brake chambers to the respective ports at the securing pads.

A further feature of the invention relates to means for obviating the "blowing down" of the trailer reservoir due to vibration or fluttering of the intake valve. This undesirable action occurs when the pressure in chamber 96, Figure 4, is suddenly dropped from a high pressure to nearly atmospheric and then as suddenly raised, say to about twenty pounds. This operation of the master valve is often made necessary during quick complete release and immediate reapplication of the brakes. With this particular operation, the diaphragm 94 and connected inlet valve 100 are thrown into a state of continuous oscillation, the energy to sustain this oscillatory effect being derived from the compressed air of the trailer reservoir.

Explaining this unusual action, the sudden reduction in pressure above the diaphragm causes an appreciable pressure differential forcing the diaphragm rapidly upward. Due to the large area of the exhaust valve, the pressure in the lower chamber 98 drops below that of the upper chamber 96 before the exhaust valve can close. This pressure differential causes the diaphragm and guide to move downwardly again at high speed, the valve operating guide 122 striking a hammer blow on the intake valve stem 124 opening it wide. This action may be accentuated by the sudden increase in pressure in the chamber above the diaphragm. With the opening of the inlet valve the pressure below the diaphragm suddenly builds up above the pressure in the upper chamber, and before the intake valve can completely close, resulting in an upward acceleration of the diaphragm and guide. This causes the exhaust valve to open wider than is necessary to balance the pressure in the two chambers, and as the pressure again drops in the lower chamber the guide is again accelerated downwardly sufficiently to again open the intake valve. There is thus incurred a condition of continuous oscillation sustained by the energy of the air entering the intake valve and resulting in a leakage from the exhaust port, which will rapidly "blow down" the reservoir. The frequency of the vibration is, among other variables, a function of the diaphragm diameter, diaphragm stiffness, weight of the reciprocating parts, tension of the intake valve spring, volume of the various air chambers and the size of the various ports.

In order that this undesirable effect be obviated, there is suggested the provision of friction means in the form of a spring brass ring 126 installed in a groove in the spaced peripheral portions 49 of the guiding spider 122 and adapted to press against the wall of the guide bore with a slight tension, thus imposing a slight friction impeding the motion of the guide. This structure is entirely successful, the friction imposed on the guide being sufficient to retard its motion and throw it out of phase with the natural vibratory period of the system, the vibration or oscillatory effect being immediately dampened out.

There is thus provided a very compact trailer brake control structure, the relay and emergency valves functioning to quickly and effectively apply and release the brakes under all conditions of service.

It will be understood that while the illustrated embodiments of the invention are described as shown, a considerable latitude is to be permitted in construction within the range of the appended claims.

We claim:

1. A valve assembly for fluid pressure brakes comprising, in combination with a brake chamber and a reservoir, a casing member, a valve stem mounted for reciprocatory movement in said casing, inlet and emergency valve members mounted on said stem, and means in said casing constructed and arranged to actuate said stem to open said inlet valve member without however closing said emergency valve member to thereby place the reservoir in circuit with the brake chamber to energize the latter and apply the brakes.

2. A valve assembly for fluid pressure brakes comprising, in combination with a brake chamber and a reservoir, a casing member, a valve stem mounted for reciprocatory movement in said casing, inlet and emergency valve members mounted on said stem, a diaphragm operated guide member constructed and arranged to actuate said stem to open said inlet valve without however closing said emergency valve member to thereby place the reservoir in circuit with the brake chamber to energize the latter and apply the brakes.

3. A valve assembly for fluid pressure brakes comprising, in combination with a brake chamber and a reservoir, a casing member, a valve stem mounted for reciprocatory movement in said casing, inlet and emergency valve members mounted on said stem, a diaphragm operated guide member having a telescoping slide fit with said stem and adapted to actuate the latter to open said inlet valve without however closing said emergency valve member to thereby place the reservoir in circuit with the brake chamber to energize the latter and apply the brakes.

4. A valve assembly for fluid pressure brakes mounted on a tractor drawn trailer comprising, in combination with a brake chamber and a reservoir, a casing member, a valve stem mounted for reciprocatory movement in said casing, inlet and emergency valve members mounted on said stem, means in said casing constructed and arranged to actuate said stem to open said inlet valve without however closing said emergency valve member to thereby place the reservoir in circuit with the brake chamber to energize the latter and apply the brakes and means also mounted on said stem for automatically opening said inlet valve to effect an emergency application of the trailer brakes in the event of a "break in two" between the tractor and trailer.

5. A valve assembly for fluid pressure brakes mounted on a tractor drawn trailer comprising, in combination with a brake chamber and a reservoir, a casing member, a valve stem mounted for reciprocatory movement in said casing, inlet and emergency valve members mounted on said stem, means in said casing constructed and arranged to actuate said stem to open said inlet valve without however closing said emergency valve member to thereby place the reservoir in circuit with the brake chamber to energize the latter and apply the brakes and a flexible diaphragm also mounted on said stem for automatically opening said inlet valve to effect an emergency application of the trailer brakes in the event of a "break in two" between the tractor and trailer.

6. A valve assembly for fluid pressure brakes comprising a casing, a valve stem within said casing mounted for reciprocatory movement, inlet and emergency valve members mounted on said stem and oppositely disposed valve operating flexible diaphragms within said casing, each of said diaphragms adapted to impart movement to said valve stem in one direction.

7. A valve assembly for a tractor and trailer fluid pressure braking system comprising, in combination with a brake chamber, a trailer reservoir, a tractor reservoir and fluid transmitting connections extending from said chamber and reservoirs, a valve housing means having a pair of open ends, closure members at each of said open ends, partitions within said housing means, a pair of independently movable parallel valve members mounted for reciprocatory movement in said housing means, and a valve operating diaphragm at each of said ends of said housing means, one of said diaphragms having its peripheral portion resiliently urged into contact with a portion of said housing means, the intermediate portion of said diaphragm cooperating with said housing means to form an exhaust valve, said diaphragms, partitions and closure members together defining fluid receiving chambers, said housing means and at least one of said closure members being provided with ports to interconnect said chambers and the aforementioned fluid transmitting connections.

8. A valve assembly for a tractor and trailer fluid pressure brake system comprising, in combination with a brake chamber, a trailer reservoir, a tractor reservoir and fluid transmitting connections extending from said chamber and reservoirs, a valve housing means having a pair of open ends, closure members at each of said open ends, partitions within said housing means, a pair of independently movable parallel valve members mounted for reciprocatory movement in said housing means, and a flexible valve operating diaphragm at each of said ends of said housing means, one of said diaphragms having its peripheral portion resiliently urged into contact with a portion of one of said closure members, said peripheral portion constituting with said last named closure member an intake valve for said trailer reservoir, said diaphragms, partitions and closure members together defining fluid receiving chambers, said housing means and at least one of said closure members being provided with ports to interconnect said chambers and the aforementioned fluid transmitting connections.

9. In a valve assembly for the purpose described, a valve body, a closure member secured to one end of said body, a valve stem within said valve body mounted for reciprocatory movement, a valve member mounted on said stem, a diaphragm member also mounted on said stem, said diaphragm member defining, together with said body member and closure member, two fluid receiving chambers, yieldable means interposed between the end wall of said valve body member and said diaphragm and other yieldable means interposed between the diaphragm and said closure member.

10. In a fluid pressure braking system having a brake chamber, a valve device including a casing having a chamber therein communicating with said brake chamber, a reciprocatory intake valve having an annular valve seat in said casing for controlling the passage of fluid under pressure into said casing chamber, resilient means for normally maintaining said valve closed, a sliding guide member in said casing operatively associated with said intake valve, a diaphragm secured to said guide member and adapted to be subjected to fluid under pressure for moving said guide member in one direction for opening said valve, means controlled by movement of said diaphragm in another direction upon release of fluid pressure from said diaphragm for exhausting fluid from said casing chamber, and means for automatically dampening vibration of said intake valve set up during operation thereof comprising a resilient ring carried by said guide member and frictionally engaging the wall of said casing chamber.

11. A valve assembly for fluid pressure brakes comprising a casing, a closure member for said casing, a valve stem in said casing mounted for reciprocatory movement therein and having a valve head thereon, a diaphragm carried by said stem and defining with said closure member and casing two fluid receiving chambers, a spring interposed between said casing and the peripheral portion of said diaphragm and normally maintaining said portion in contact with said closure member, and a second spring interposed between said closure member and diaphragm.

STEPHEN VORECH.
WILFRED A. EATON.